US009886276B2

(12) United States Patent
Pierron et al.

(10) Patent No.: US 9,886,276 B2
(45) Date of Patent: Feb. 6, 2018

(54) SYSTEM REGISTER ACCESS

(71) Applicant: ARM LIMITED, Cambridge (GB)

(72) Inventors: Loïc Pierron, Cambridge (GB); Antony John Penton, Cambridge (GB)

(73) Assignee: ARM Limited, Cambridge (GB)

( * ) Notice: Subject to any disclaimer, the term of this patent is extended or adjusted under 35 U.S.C. 154(b) by 349 days.

(21) Appl. No.: 14/511,388

(22) Filed: Oct. 10, 2014

(65) Prior Publication Data

US 2016/0103685 A1    Apr. 14, 2016

(51) Int. Cl.
*G06F 9/30*    (2006.01)
*G06F 9/40*    (2006.01)

(52) U.S. Cl.
CPC ...... *G06F 9/30145* (2013.01); *G06F 9/30123* (2013.01)

(58) Field of Classification Search
None
See application file for complete search history.

(56) References Cited

U.S. PATENT DOCUMENTS

| | | | | |
|---|---|---|---|---|
| 5,212,795 A | * | 5/1993 | Hendry | G06F 13/28 710/28 |
| 5,588,152 A | * | 12/1996 | Dapp | G06F 9/3838 712/16 |
| 5,742,538 A | * | 4/1998 | Guttag | G06F 7/53 708/620 |
| 5,940,311 A | * | 8/1999 | Dao | G06F 5/00 708/204 |
| 6,282,638 B1 | * | 8/2001 | Dowling | G06F 9/462 712/228 |
| 2006/0259744 A1 | * | 11/2006 | Matthes | G06F 15/7867 712/220 |
| 2008/0184007 A1 | * | 7/2008 | Codrescu | G06F 9/30032 712/1 |
| 2009/0222644 A1 | * | 9/2009 | Inoue | G06F 9/30021 712/22 |
| 2017/0083314 A1 | * | 3/2017 | Burger | G06F 9/3004 |

* cited by examiner

*Primary Examiner* — Michael Sun
(74) *Attorney, Agent, or Firm* — Nixon & Vanderhye P.C.

(57) ABSTRACT

A data processing apparatus for accessing several system registers using a single command includes system registers and command generation circuitry capable of analysing a plurality of decoded system register access instructions, each specifying a system register identifier. In response to a predetermined condition, the command generation circuitry generates a single command to represent the plurality of decoded system register access instructions. The predetermined condition comprises a requirement that a total width of the system registers specified by the plurality of decoded system register access instructions is less than or equal to a predefined data processing width.

19 Claims, 5 Drawing Sheets

SYSTEM REGISTER ACCESS

BACKGROUND

The present disclosure relates to the field of accessing system registers in a data processing apparatus.

In a data processing apparatus, a context switch is performed to change the process that is currently executing on the processing circuitry. The process may be another application, the context switch being performed by the operating system. Where virtualisation is used, the process may be a guest operating system, with the context switch being performed by a hypervisor or host operating system.

One or more system registers are used to control the behaviour of the data processing apparatus. Each process can have its own set of values for these system registers. Consequently, when a context switch occurs, it is necessary to swap out the current values of those system registers, e.g. by saving them to data storage circuitry and to swap in values associated with the process that is next to execute on the processing circuitry.

The process of swapping values in and out of system registers can require numerous processor cycles, particularly if there are many system registers. One way in which this problem can be solved is to increase the number of pipelines for handling system register accesses. However, this is not always a desirable, since it increases the size of the processor core and can lead to an increase in power consumption.

Since context switches can occur many times per second, it is desirable to speed up the process of saving and loading the system registers in order to speed up the context switch time, without significantly increasing the size of the processor core.

SUMMARY

According to a first aspect, there is provided a data processing apparatus comprising: a plurality of system registers; and command generation circuitry capable of analysing a plurality of decoded system register access instructions, each specifying a system register identifier, and in response to a predetermined condition, capable of generating a single command to represent the plurality of decoded system register access instructions, wherein the predetermined condition comprises a requirement that a total width of the system registers specified by the plurality of decoded system register access instructions is less than or equal to a predefined data processing width.

According to a second aspect, there is provided a method of accessing system registers, comprising the steps: processing commands that access system registers from the plurality of system registers; analysing a plurality of decoded system register access instructions, each specifying a system register identifier; and in response to a predetermined condition, generating a single command to represent the plurality of decoded system register access instructions, wherein the predetermined condition comprises a requirement that a total width of the system registers specified by the plurality of decoded system register access instructions is less than or equal to the data processing width.

According to a third aspect, there is provided a data processing apparatus comprising: a plurality of system registers; and means for analysing a plurality of decoded system register access instructions, each specifying a system register identifier, and in response to a predetermined condition, for generating a single command to represent the plurality of decoded system register access instructions, wherein the predetermined condition comprises a requirement that a total width of the system registers specified by the plurality of decoded system register access instructions is less than or equal to the predefined data processing width.

BRIEF DESCRIPTION OF THE DRAWINGS

The present technique will be described further, by way of example only, with reference to embodiments thereof as illustrated in the accompanying drawings, in which.

DESCRIPTION OF EXAMPLE EMBODIMENTS

Figure 1:
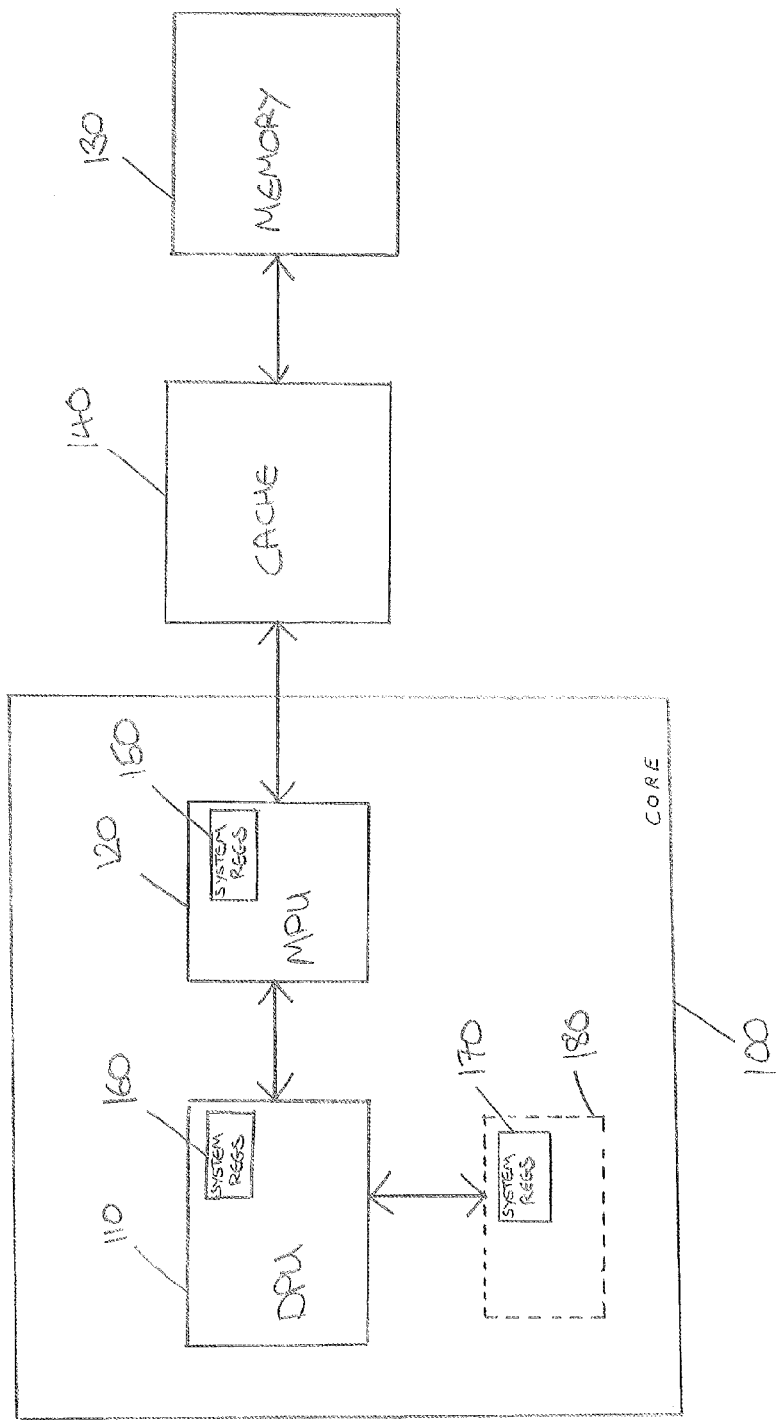
FIG. 1 illustrates, schematically, a data processing apparatus in accordance with one embodiment.

According to a first aspect, there is provided a data processing apparatus comprising: a plurality of system registers; and command generation circuitry capable of analysing a plurality of decoded system register access instructions, each specifying a system register identifier, and in response to a predetermined condition, capable of generating a single command to represent the plurality of decoded system register access instructions, wherein the predetermined condition comprises a requirement that a total width of the system registers specified by the plurality of decoded system register access instructions is less than or equal to a predefined data processing width.

In some embodiments, the data processing apparatus further comprises command processing circuitry capable of processing commands to access system registers from the plurality of system registers, the command processing circuitry having said predefined data processing width.

In some embodiments, the data processing apparatus further comprises access handling circuitry capable of, in response to receiving and interpreting the single command, accessing a plurality of system registers specified by the plurality of decoded system register access instructions.

The command generation circuitry can determine whether or not decoded system register access instructions identify system registers in which the total width of the identified system registers is less than or equal to a data processing width of the command processing circuitry. If such a condition is met, then a single command is generated by the command generation circuitry that represents the decoded system register access instructions. When the single command is received, a plurality of system registers identified by the decoded system register access instructions is accessed. Consequently, even though only a single command is generated, a plurality of system registers can be accessed and so more system registers can be accessed from a smaller number of issued commands. The number of processor cycles required to access all the system registers (which may be necessary in a context switch operation) can therefore be reduced. This is achieved by a bandwidth of the command processing circuitry being used more efficiently. For example, rather than issuing a single command for each access, one command may (data processing width permitting) cause multiple system register accesses to take place.

In some embodiments, the predetermined condition comprises a further requirement that the plurality of system registers specified by the plurality of decoded system register access instructions have a predetermined relationship. In particular, the first system register access can be based on an identifier provided in the command. The second system register access can then be based on a second system register that has the predefined relationship with the first system register. Accordingly, it is not necessary to include any additional information in the command in order to effect multiple system register accesses.

In some embodiments, the predetermined relationship is that the plurality of system registers specified by the plurality of decoded system register access instructions are separated by a predetermined offset. This may be advantageous if, for example, numerous sets of system registers share the predetermined offset from each other, since this can allow all such sets to be accessed using a single command per set. For example, the predetermined offset may be such that logically adjacent system registers are identified. Consequently, specifying a particular system register to be accessed may enable that system register and the next system register to be accessed using a single command.

In some embodiments, the system registers specified by the plurality of decoded system register access instructions each have a width that is a factor (i.e. a divisor) of the data processing width. Consequently, a whole number of equally-sized system registers may be accessed when a single command is issued. In other embodiments, more than one system register may still be accessed via a single command. For example, if the data processing width is 64 bits then a single command may be used to access both a 48-bit system register and a 16-bit system register.

In some embodiments, each system register specified by the plurality of decoded system register access instructions has a width equal to half the predefined data processing width. In other words, a single command may access two system registers.

In some embodiments, the single command specifies a single system register identifier. By specifying a single system register identifier, it is possible for much of the circuitry used in the data processing unit to remain unchanged. In particular, it may only be necessary to make minor modifications to the command generation circuitry to detect the predetermined condition and the access handling circuitry to respond to the single command. In other embodiments, the single command can specify a single system register together with an offset that causes another system register to be specified. By providing an offset, it may be possible to access two arbitrary system registers via each command.

In some embodiments, the single command comprises an identifier to indicate that the single command represents a plurality of decoded system register access instructions. Consequently, the access handling circuitry can efficiently determine whether a received command is the single command that causes a plurality of system registers to be accessed, or a command that causes a single system register to be accessed.

Although there are a number of ways in which an identifier can be used to indicate that the single command represents a plurality of decoded system register access instructions, in some embodiments, the identifier indicates that an access width of the single command is equal to the predefined data processing width and the width of the system registers specified by the plurality of decoded system register access instructions is less than the predefined data processing width. By specifying an access width equal to the data processing width and bigger than the size of the specified system register, it can be indicated that system registers beyond those being identified are also to be accessed. Furthermore, since this situation should not ordinarily arise (since a single system register cannot make use of more bits than that system register can store), there is little risk of this mechanism for identifying the single command being inadvertently used.

In some embodiments, each decoded system register access instruction in the plurality of decoded system register access instructions specifies a different system register identifier. Therefore, a number of different system registers can be accessed in a small number of processor cycles. This may be useful, for example, if a large set of system registers is to be saved or loaded.

In some embodiments, there is provided a pair of decoding units capable of receiving a pair of system register access instructions, to decode the system register access instructions and to provide the decoded system register access instructions to the command generation circuitry. By providing a pair of decoding units, it is possible to simultaneously decode more than one system register access instruction.

In some embodiments, there is provided a memory protection unit comprising a subset of the system registers, each system register in said subset having a width less than or equal to half the predefined data processing width, and the plurality of decoded system register access instructions specifying system registers in said subset. In these embodiments, the subset of system registers may be accessed in a number of ways. However, in some of these embodiments, the single command issued by the command processing circuitry accesses the subset of system registers via a load/store unit. In some embodiments, the load/store unit may be unmodified and in such embodiments, modifications may be confined to the data processing unit and the memory protection unit.

The plurality of system registers may comprise system registers of a first width and system registers of a second width smaller than the first width; and the predetermined condition may comprise a requirement that the plurality of system registers specified by the plurality of decoded system register access instructions are system registers of the second width.

The command processing circuitry may have a plurality of pipeline stages. Accordingly, a number of commands may be in the process of being executed at the same time.

According to a second aspect, there is provided a method of accessing system registers, comprising the steps: processing commands that access system registers from the plurality of system registers; analysing a plurality of decoded system register access instructions, each specifying a system register identifier; and in response to a predetermined condition, generating a single command to represent the plurality of decoded system register access instructions, wherein the predetermined condition comprises a requirement that a total width of the system registers specified by the plurality of decoded system register access instructions is less than or equal to the data processing width.

According to a third aspect, there is provided a data processing apparatus comprising: a plurality of system registers; and means for analysing a plurality of decoded system register access instructions, each specifying a system register identifier, and in response to a predetermined condition, for generating a single command to represent the plurality of decoded system register access instructions, wherein the predetermined condition comprises a requirement that a total width of the system registers specified by the plurality of decoded system register access instructions is less than or equal to the predefined data processing width.

FIG. 1 shows, schematically, an example of a processor core 100. The processor core 100 comprises a data processing unit 110, which receives instructions and outputs commands to processing units 120, 180 in the processor core to cause the instructions to be executed. One such unit is the memory protection unit (MPU) 120. The MPU handles access permission checks to a memory 130. In particular, the MPU may specify a number of regions of the memory 130 together with the extent to which those regions of memory 130 can be accessed. For example, it may be the case that particular areas of memory 130 can be read but cannot be written to. Other areas of memory 130 may be entirely inaccessible. The different regions of memory 130 are specified, and the extent of access controlled, by the values stored in one or more system registers 150. Further system registers 160 may be found in the data processing unit 110 itself and still further system registers 170 may be found in other units 180 of the processor core 100.

The values of the system registers 150, 160, 170 may be particular to the current process that is being executed in the processor core 100. In particular, if another process is to be executed, then it the values of the system registers 150, 160, 170 may have to be changed. For example, another process may have different access to regions of memory 130 and accordingly, the values of the system registers 150 stored in the memory protection unit 120 may have to be updated. During a context switch, which occurs when the process being executed on the processor core 100 is changed, the current values of the system registers 150, 160, 170 are saved and the values corresponding to another process are retrieved and written to the system registers 150, 160, 170. Values of the system registers 150, 160, 170 associated with processes that are not currently executing in the processor core may be stored in data storage circuitry such as the memory 130 or a cache 140 associated with the memory 130, or other non-system registers such as those in the data processing unit 110.

Figure 2:
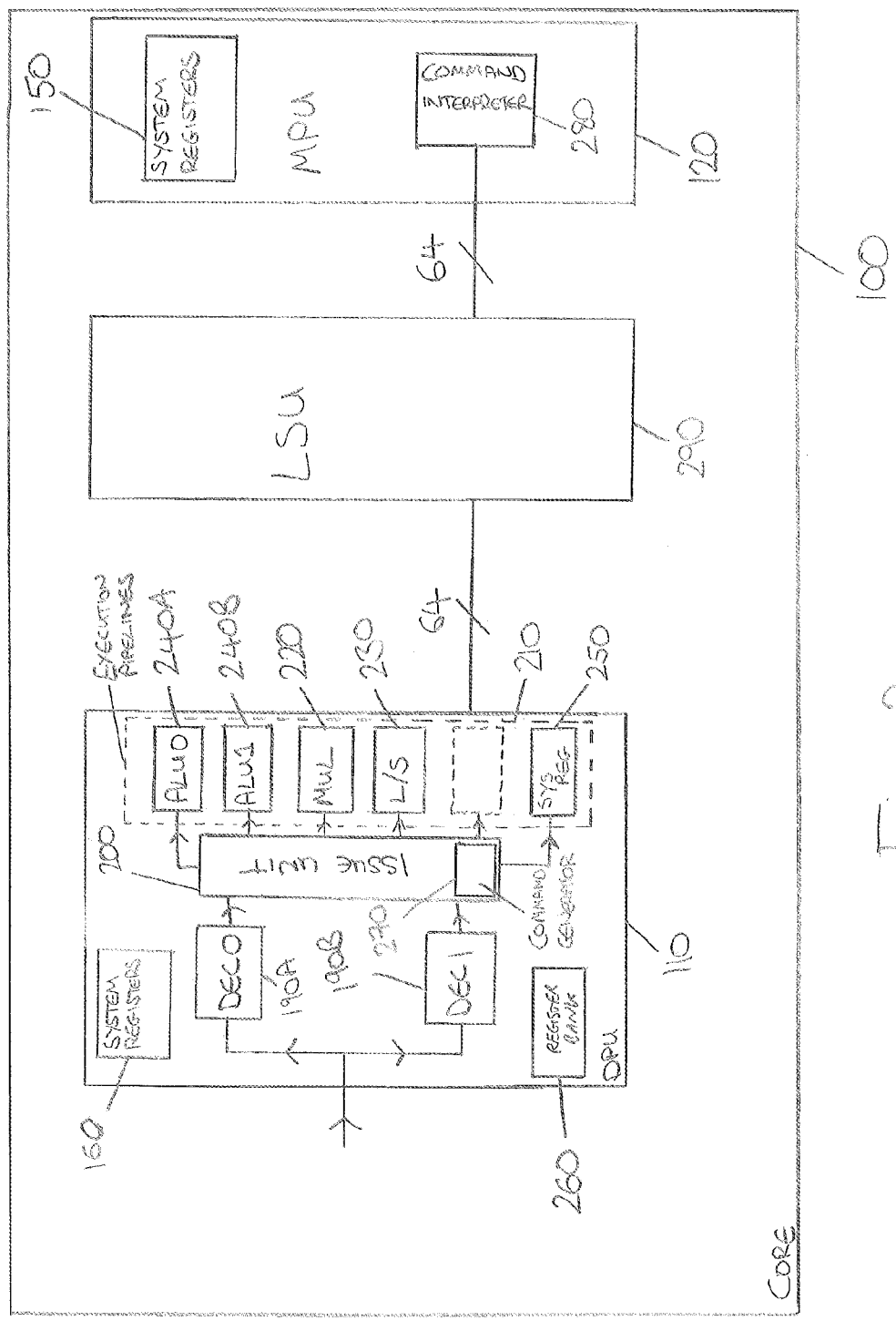
FIG. 2 illustrates, schematically, a data processing apparatus comprising a processing core in accordance with one embodiment.

FIG. 2 schematically shows a more detailed view of the processor core 100 in accordance with one embodiment. As shown in FIG. 2, the data processing unit 110 of the processor core 100 comprises two decoding units 190A, 190B. Each of these decoding units 190A, 190B receives an instruction to be executed, decodes the received instruction and transmits a signal to the issue unit 200, which is an example of command generation circuitry. Accordingly, the issue unit 200 may simultaneously receive two signals, each signal corresponding to different instruction.

Depending on the type of decoded instruction signal received by the issue unit 200, the issue unit 200 will issue a command to one of the execution pipelines 210. For example, if the instruction relates to a multiplication instruction, then a corresponding command may be sent from the issue unit 200 to the multiplication execution pipeline 220. Memory load/store instructions may cause a command to be transmitted to the load/store execution pipeline 230. Each of the execution pipelines 210 is capable of handling a single command in one clock cycle. Accordingly, for example, if two memory load/store instructions are simultaneously decoded in the embodiment shown in FIG. 2 and if there is only a single load/store execution pipeline 230, then the commands corresponding to those instructions will require to be executed one after the other by the single load/store execution pipeline 230. The set of execution pipelines 210 shown in FIG. 2 is not intended to be exhaustive, but is shown to includes two Arithmetic Logic Unit (ALU) pipelines 240A, 240B. Accordingly, the processor core 100 is capable of executing two arithmetic commands simultaneously. The final execution pipeline shown in the embodiment of FIG. 2 is a system register execution pipeline 250, which is an example of command processing circuitry, and which handles storing and loading data values to/from system registers.

In the embodiment shown in FIG. 2, when a context switch is to occur, some of the values stored in system registers 150, 160, 170 must be loaded into the register bank 260, which comprises general purpose registers. Registers in the register bank 260 that hold system register values for the process to be swapped in must then be saved back to the system registers 150, 160, 170. This whole process may result in a large number of system register access instructions to be executed (perhaps up to two times the number of system registers in the architecture). With a single system register pipeline 250 being present in the data processing unit 110, this can take many processor cycles to execute. Since a context switch can occur many times per second, a large proportion of system resources can be expended in performing context switches. Although it would be possible to add a further system register pipeline to the set of execution pipelines 210, this will cause the processing core to increase in size and will cause the power consumption to increase, both of which are undesirable.

The inventors of the present technique have realised that in some cases, it is possible to make better use of the system register pipeline 250 bandwidth in order to access system registers more efficiently. In particular, the system register pipeline 250 bandwidth may be bigger than the size (width) of a single system register. For example, in the embodiment shown in FIG. 2, the size (width) system register pipeline 250 bandwidth is 64 bits, whilst the size of one of the system registers 150 in the MPU is only 32 bits. By generating a single system register access command in a special way, it is possible for multiple system registers to be accessed as a result of that single command.

Figure 3:
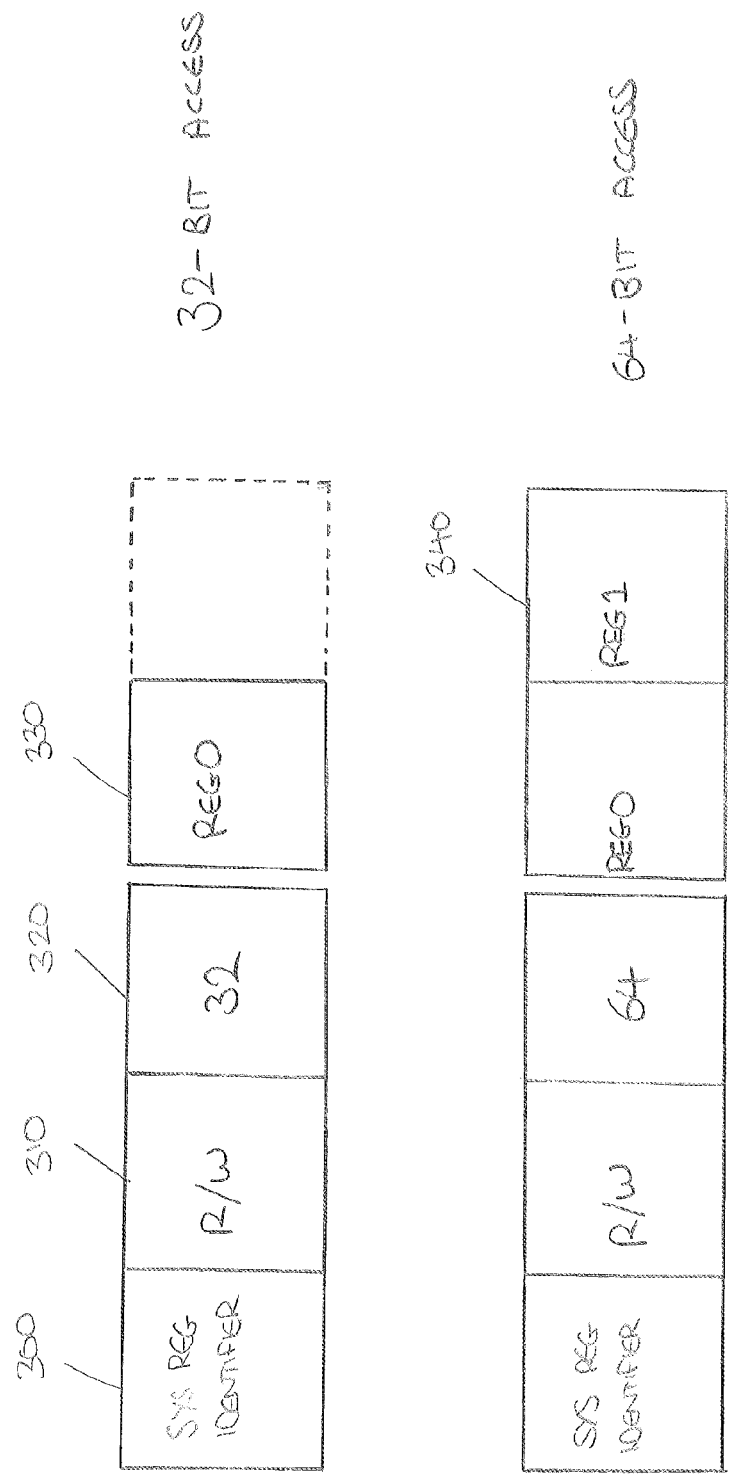
FIG. 3 illustrates an example of a command, generated by a command generator unit in one embodiment.

In the embodiment in FIG. 2, a command generator 270 is provided in the data processing unit 110. The command generator determines whether two decoded system register access instructions received from the decode units 190A, 190B access system registers that are 32 bits and if the two accessed system registers have a particular predefined relationship. Such a relationship may be, for example, that the system registers are logically adjacent to each other. If these conditions are met, then only one specially formatted command is sent to the system register access pipeline 250 and that single command refers to only one of the identifiers (e.g. addresses) of the two system registers that are to be accessed. An example of the special command is shown in FIG. 3. The single command is received by a command interpreter 280, which detects the special formatting and accesses the two system registers that were referred to in the decoded system register access instructions even though the special command contains only a single identifier (e.g. address) to one of the system registers.

One particularly advantageous feature of the embodiment shown in FIG. 2 is that the load/store unit 290, through which system register access commands may normally be sent, need not be modified. Instead, the only modifications required are to the data processing unit 110 and the memory protection unit 120.

FIG. 3 shows an example of the how a command generated by the command generator 270 and sent to the system register access pipeline 250 may be used to access two system registers 150, 160 when only one system register identifier is presented. The command comprises an identifier of the system register to be accessed 300, an indication 310 of whether the access is a read or write to that system register, and an access mode 320 (also referred to as an "access width"). In the embodiments described herein, the access mode indicates, for example, the number of bits that are involved in the access operation. When accessing a 32-bit system register, the value of the access mode will typically be 32, whereas when accessing a 64-bit system register, the value of the access mode will typically be 64.

Additionally, when operating in a 32-bit access mode, the issue unit 200 may keep track of a first register identifier 330. The register corresponding with this identifier may either provide a value that is to be stored in the system registers 150, 160 or may provide a destination storage location for the value that is retrieved from the system registers 150, 160. When operating in a 64-bit access mode, the issue unit may keep track of a second register identifier 340. The register corresponding with this second identifier 340 may be used in combination with the first identifier 330 to either provide a value to be stored in the system registers 150, 160 or else to provide a destination for the value currently stored in the system registers 150, 160.

In the present embodiment, it is possible to cause two system registers 150 to be accessed even when providing only a single system register identifier 300. In particular, by providing the identifier of a 32-bit system register, but by specifying a 64-bit access mode, it is possible to cause the MPU 120, for example, to access a first 32-bit system register specified by the identifier 300 and also a second 32-bit system register having a predefined relationship with the system register specified by the identifier 300. The predefined relationship is the same predefined relationship that can be detected by the command generator 270.

For example, consider the situation in which two instructions are decoded by the decoding units 190A, 190B, which are to access the logically adjacent 32-bit system registers sr1 and sr2 in the set of system registers 150 in the MPU 120 and to load the values stored in sr1 and sr2 in registers r1 and r2 in the register bank 260. If the command generator 270 is configured to detect pairs of logically adjacent system registers, then a single command may be issued, specifying 64-bit access mode, but only providing an identifier of sr1. In addition, the system register pipeline 250 may keep track of the identifiers r1 and r2 for when the values are retrieved from sr1 and sr2.

When received by the command interpreter 280, even though only a single system register identifier 300 is provided, the fact that the identifier 300 is to a 32-bit system register coupled with the fact that the command specifies a 64-bit access mode means that system register sr1 and the system register logically adjacent to it (sr2) will be loaded. The values in those system registers are then returned to the DPU 110. The DPU 110 then stores the returned values in registers r1 and r2 in the register bank 260, which the system register pipeline 250 has kept track of.

Accordingly, only a single command is executed and multiple system registers 150 are accessed as a result. Accordingly, the bandwidth of the system register access pipeline 250 is used more efficiently and so system register access instructions may be dealt with in fewer clock cycles, leading to faster context switches.

Figure 4:
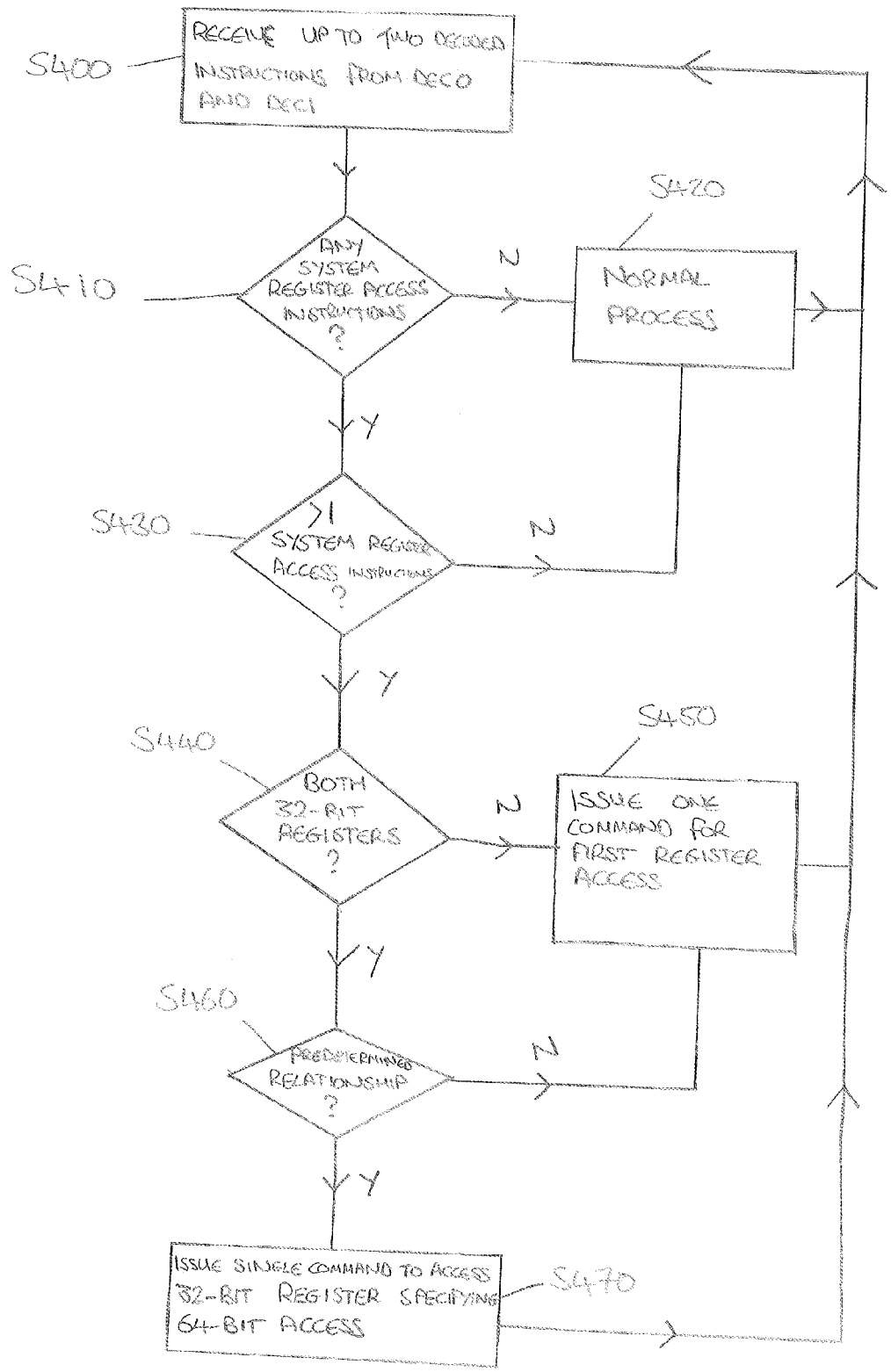
FIG. 4 shows, in flow chart form, the operation of a command generator unit and issue unit in accordance with one embodiment.

FIG. 4 illustrates, in flow chart form, a method of issuing commands in accordance with one embodiment. Such a process may, for example, be performed by the command generator 270. The process starts at step S400 where up to two decoded instructions are received from the decoding units 190A, 190B. At step S410, it is determined whether or not any of the decoded instructions are system register access instructions. If not, the normal processing method is used to process those decoded instructions in step S420 and the process flow returns to step S400 where a further set of decoded instructions may be received.

Alternatively, if at step S410 some of the decoded instructions are system register access instructions, then at step S430, it is determined whether or not there is more than one system register access instruction. If not, then the flow proceeds to step S420 where, again, normal processing of the instructions proceeds and further decoded instructions may then be received at step S400.

Alternatively, if at step S430 it is determined that there is more than one system register access instruction then at step S440, it is determined whether both of the system register access instructions are directed towards 32-bit system registers. If not, then at step S450, one instruction is handled in one clock cycle and the next instruction is handled in a later clock cycle. Note that each instruction may take multiple clock cycles to execute. Flow then proceeds to step S400 where further decoded instructions may be received from the decode units 190A, 190B.

Alternatively, if at step S440 it is determined that both of the system register access instructions are directed towards 32-bit system registers then at step S460, it is determined whether or not those system registers have a predefined relationship. For example, this relationship may be that the system registers are logically adjacent to each other. If not, then at step S450, one command is issued for the first register access. Flow then proceeds to step S400 where further decoded instructions may be received from the decode units 190A, 190B.

If, at step S460, the system registers do have a predefined relationship, then at step S470 a single command may be issued. As previously discussed, the single command provides an identifier (e.g. an address) of one of the 32-bit system registers, but also specifies 64-bit access mode. Flow then proceeds to step S400 where further decoded instructions may be received at the issue unit 200.

Figure 5:
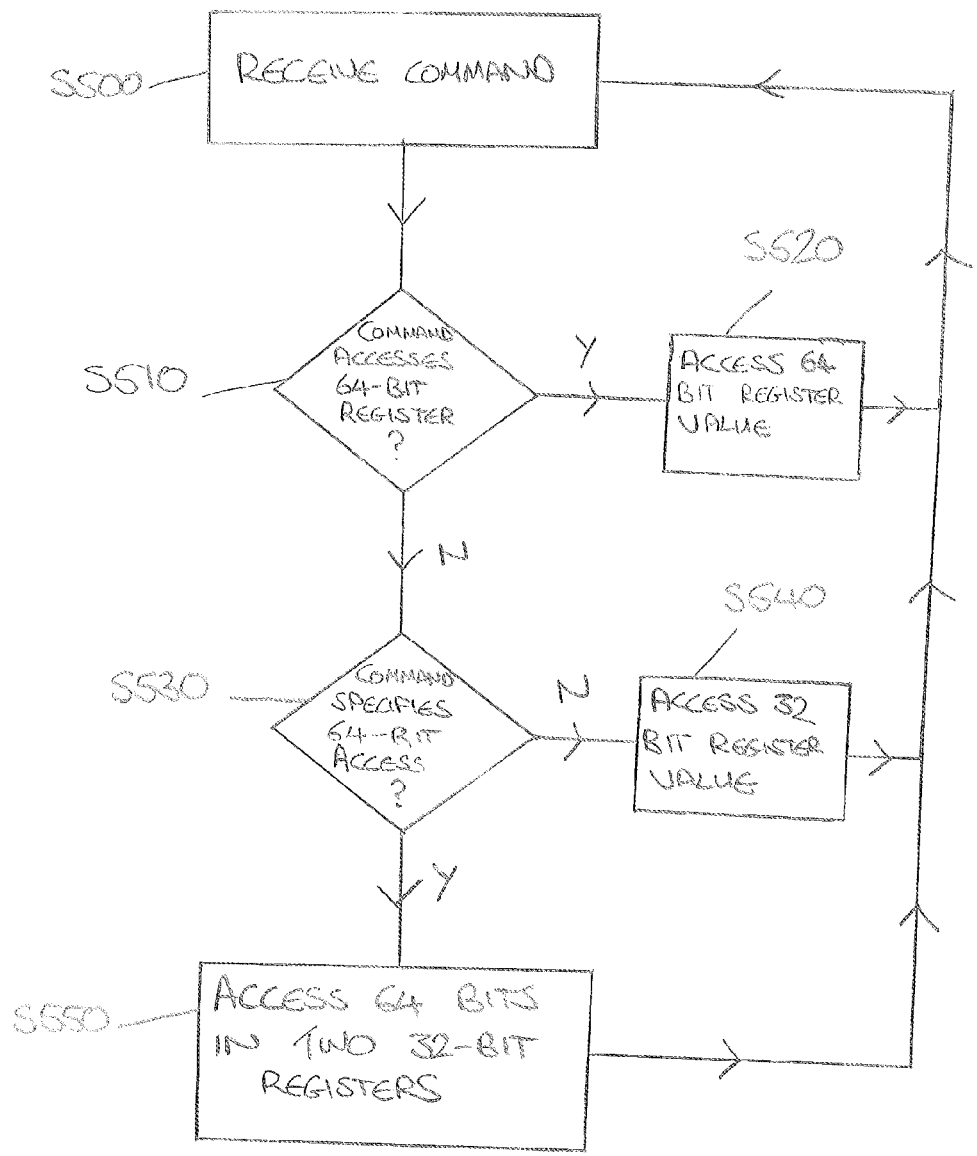
FIG. 5 shows, in flow chart form, the operation of a command interpreter unit that receives a command generated by a command generator unit, in accordance with one embodiment.

FIG. 5 illustrates one way of responding to a received command. Such a process may be performed, for example, by the command interpreter 280. The process begins at step S500 in which a command is received. At step S510 it is determined whether or not the command accesses a 64-bit system register. For example, it is determined whether or not the identifier 300 corresponds with a system register that has 64 bits. If so, then at step S520, the 64-bit system register is accessed at step S520 and flow returns to step S500 where the next command is received.

Alternatively, if at step S510, it is determined that the command does not access a 64-bit system register then at step S530, it is determined whether or not the command specifies a 64-bit access. For example, it is determined whether or not the access mode 320 in the command specifies 64 bits or not. If not, then it is determined that the command is only intended to access a single system register and that single 32-bit system register is accessed at step S540 before the flow returns to step S500 where the next command is received.

Alternatively, if at step S530, it is determined that the command does specify a 64-bit access mode, then at step S550, 64 bits are accessed in total, by accessing two 32-bit system registers. The two 32-bit system registers that are accessed consist of the system register identified by the system register identifier 300 in the received command, together with a second system register determined according to the special relationship that is detected by the command generator 270. In this embodiment, therefore, the 32-bit system register identified by the system register identifier 300 is accessed, together with the system register that is logically adjacent to that identified system register. Flow then returns to step S500.

Accordingly, it can be seen that in these embodiments, the number of system register access commands can be reduced and system registers 150 can be accessed in fewer processor cycles.

Note that in other embodiments, it may be more efficient to invert steps S510 and S530. For example, in such an embodiment, the access mode (320) may be considered before the type of register being accessed is considered.

Throughout the description, a predefined relationship between system registers has been mentioned. It will be appreciated that this relationship can be defined in any manner required. Furthermore, it will also be appreciated that the predefined relationship may be dynamically changeable. For example, by including an offset in the command, it may be possible to access two arbitrary system registers in dependence on the identified system register and a second system register determined from the offset.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   a plurality of system registers; and
   command generation circuitry capable of analysing a plurality of decoded system register access instructions, each specifying a system register identifier, and in response to a predetermined condition, capable of generating a single command to represent the plurality of decoded system register access instructions,
   wherein the predetermined condition comprises a requirement that a total width of the system registers specified by the plurality of decoded system register access instructions is less than or equal to a predefined data processing width.

2. The data processing apparatus according to claim 1 further comprising,
   command processing circuitry capable of processing commands to access system registers from the plurality of system registers, the command processing circuitry having said predefined data processing width.

3. The data processing apparatus according to claim 1 further comprising,
   access handling circuitry capable of, in response to receiving and interpreting the single command, accessing a plurality of system registers specified by the plurality of decoded system register access instructions.

4. The data processing apparatus according to claim 1, wherein the predetermined condition comprises a further requirement that the plurality of system registers specified by the plurality of decoded system register access instructions have a predetermined relationship.

5. The data processing apparatus according to claim 4, wherein the predetermined relationship is that the plurality of system registers specified by the plurality of decoded system register access instructions are separated by a predetermined offset.

6. The data processing apparatus according to claim 5, wherein the predetermined offset identifies logically adjacent system registers.

7. The data processing apparatus according to claim 1, wherein the system registers specified by the plurality of decoded system register access instructions each have a width that is a factor of the data processing width.

8. The data processing apparatus according to claim 7, wherein each system register specified by the plurality of decoded system register access instructions has a width equal to half the data processing width.

9. The data processing apparatus according to claim 1, wherein the single command specifies a single system register identifier.

10. The data processing apparatus according to claim 1, wherein the single command comprises an identifier to indicate that the single command represents a plurality of decoded system register access instructions.

11. The data processing apparatus according to claim 10, wherein the identifier indicates that an access width of the single command is equal to the data processing width; and
    wherein the width of the system registers specified by the plurality of decoded system register access instructions is less than the data processing width.

12. The data processing apparatus according to claim 1, wherein each decoded system register access instruction in the plurality of decoded system register access instructions specifies a different system register identifier.

13. The data processing apparatus according to claim 1, comprising:
    a pair of decoding units capable of receiving a pair of system register access instructions, to decode the system register access instructions and to provide the decoded system register access instructions to the generation circuitry.

14. The data processing apparatus according to claim 1, comprising:
    a memory protection unit comprising a subset of the system registers, each system register in said subset having a width less than or equal to half the data processing width, and the plurality of decoded system register access instructions specifying system registers in said subset.

15. The data processing apparatus according to claim 2, comprising:
    a memory protection unit comprising a subset of the system registers, each system register in said subset having a width less than or equal to half the data processing width, and the plurality of decoded system register access instructions specifying system registers in said subset,
    wherein the single command issued by the command processing circuitry accesses the subset of system registers via a load/store unit.

16. The data processing apparatus according to claim 1,
wherein the plurality of system registers comprises system registers of a first width and system registers of a second width smaller than the first width; and
wherein the predetermined condition comprises a requirement that the plurality of system registers specified by the plurality of decoded system register access instructions are system registers of the second width.

17. The data processing apparatus according to claim 2, wherein the command processing circuitry has a plurality of pipeline stages.

18. A method of accessing system registers, comprising the steps:
processing commands that access system registers from the plurality of system registers;
analysing a plurality of decoded system register access instructions, each specifying a system register identifier; and
in response to a predetermined condition, generating a single command to represent the plurality of decoded system register access instructions,
wherein the predetermined condition comprises a requirement that a total width of the system registers specified by the plurality of decoded system register access instructions is less than or equal to the data processing width.

19. A data processing apparatus comprising:

a plurality of system registers; and means for analysing a plurality of decoded system register access instructions, each specifying a system register identifier, and in response to a predetermined condition, for generating a single command to represent the plurality of decoded system register access instructions, wherein the predetermined condition comprises a requirement that a total width of the system registers specified by the plurality of decoded system register access instructions is less than or equal to the predefined data processing width.

* * * * *